3,538,053
NUCLEAR ALKYLATED PYRIDINE ALDEHYDE POLYMERS AND CONDUCTIVE COMPOSITIONS THEREOF
Alan Rembaum, Altadena, and Stanley Singer, Pasadena, Calif., assignors to California Institute of Technology, Pasadena, Calif., a corporation of California
No Drawing. Filed Sept. 11, 1968, Ser. No. 759,220
Int. Cl. C08f 3/40, 5/00
U.S. Cl. 260—67    9 Claims

ABSTRACT OF THE DISCLOSURE

A thermally stable, relatively conductive polymer is disclosed. The polymer is synthesized by condensing in the presence of catalyst a 2-, 4-, or 6-nuclear alkylated 2-, 3-, or 4-pyridine aldehyde or quaternary derivatives thereof to form a polymer of the formulae:

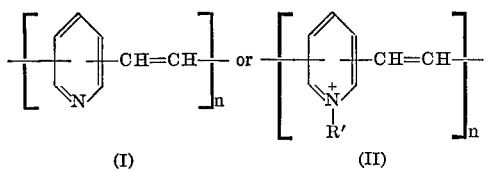

where $n$ is an integer greater than 2 and R' is aromatic or aliphatic. The pyridine groups are liked by olefinic groups between 2–4, 2–6, 2–3, 3–4, 3–6 or 4–6 positions. The quaternary polymer (II) is also prepared by quaternizing the polymer of Formula I. Conductive compositions are prepared by dissolving the quaternary polymer and an organic charge transfer complexing agent such as TCNQ in a mutual solvent such as methanol.

ORIGIN OF THE INVENTION

The invention described herein was made in the performance of work under a NASA contract and is subject to the provisions of Section 305 of the National Aeronautics and Space Act of 1958, Public Law 85–568 (72 Stat. 435; 42 USC 2457).

BACKGROUND OF THE INVENTION

Field of the invention

The present invention relates to novel polymers and to conductive compositions incorporating the same. More particularly, the invention relates to solid and heterocyclic polymers and to methods of synthesizing and utilizing such polymers.

Description of the prior art

Recently, solid nitrogen-containing polymers with polyelectrolyte properties have been synthesized. These polymers are of considerable interest due to the discovery of the pseudo-metallic behavior of certain heterocyclic organic salts. The polymers are of interest since being organic in nature, they provide greater resistance to radiation and cosmic rays than that exhibited by conventional inorganic crystalline conductors.

The available polyelectrolyte nitrogen-containing polymers suffer from complex processing with specially prepared starting materials and the conductivity and heat stability have not been particularly high. It would be desirable to prepare polymers having conductivity approaching that of inorganic semiconductors that could be prepared from readily available low-cost materials and be processed under mild reaction conditions to form conductive polymers of higher conductivity and heat resistance.

OBJECTS AND SUMMARY OF THE INVENTION

It is therefore an object of the inevntion to provide polyelectrolytes containing positive cationic centers in high molecular weight.

Another object of the invention is to provide a method of synthesizing a class of polyelectrolytes having high conductivity and high temperature stability.

Yet another object of the invention is the provision of conductive polymeric compositions in high yield from readily available low-cost starting materials and under mild and simple synthesis conditions and procedures.

These and other objects and attendant advantages of the invention will be come apparent as the description proceeds.

According to the invention, polymers of the formulae:

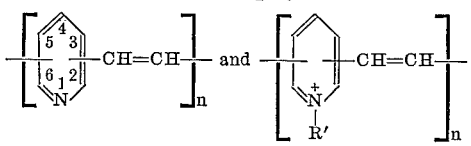

are prepared by reacting in the presence of catalyst an alkylated pyridine aldehyde of the formulae:

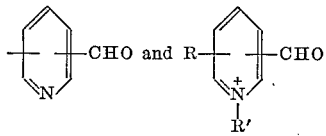

where R is lower alkyl of 1 to 5 carbon atoms, $n$ is an integer greater than 2 and preferably an integer from 10 to 1000 or more, and R' is a quaternizing moiety selected from the group consisting of aliphatic and aromatic moieties and preferably is lower alkyl, aryl, lower alkenyl or lower aralkyl.

The aldehyde group may be on any of the five ring carbon positions. The alkyl group (R) must be positioned on one of the remaining four carbon positions in which it is activated by the ring nitrogen atom. For example, when the aldehyde is in the 2-position, the alkyl group can be in the 4- or 6-position. When the aldehyde is in the 3-position, the alkyl can be in the 2-, 4-, or 6-position; and when the aldehyde is in the 4-position, the alkyl may be in the 2- or 6-position. Thus the olefin (—CH=CH—) group will bridge repeating pairs of pyridine molecules between 2–4, 2–6, 2–3, 3–4, 3–6 or 4–6 positions.

Exemplary pyridine carboxaldehydes for use in the process of the invention are 6-methyl-2-pyridine-carboxaldehyde, 4-methyl-2-pyridine-carboxaldehyde, and 2-methyl-4-pyridine-carboxaldehyde. The polymerization catalyst may be either acidic or basic and is of the class that induces the activated R (alkyl) and an aldehyde moiety from a pair of pyridine carboxaldehyde molecules to eliminate water to form a bridging olefin group. The pyridine aldehyde monomers are reacted in presence of the catalyst until a solid resin or polymeric product is obtained. In the case of the first aforementioned non-quaternized pyridine carboxaldehyde monomeric materials, the reaction is suitably conducted with heating and stirring at temperatures at about 140° C. for a period of one-half to 24 hours or more until a polymer is obtained. The catalyst may be an acid or acid anhydride. A preferred catalyst is acetic anhydride but other catalysts such as phosphorus pentoxide or zinc chloride are also effective in forming polymers according to the invention. Polymerization of the quaternized compounds is catalyzed by organic bases such as pyridine or piperidine. When acetic anhydride is utilized, it may be used as the solvent for the polymerization.

The quaternary analogues of the polymer described above can be prepared by quaternization of the pyridine carboxaldehyde monomer. The quaternization reaction proceeds by direct addition of quaternization reagents to the pyridine carboxaldehyde. Suitable quaternization reagents are the halides or sulfates of the desired quaternary moiety such as lower alkyl, aryl, lower alkenyl or lower aralkyl, iodides or sulfates such as methyl iodide or dimethyl sulfate.

It has further been discovered according to the invention that the quaternary pyridine derivative readily undergoes polymerization with mild alkaline catalyst in aqueous solution. The base-catalyzed polymerization proceeds at room temperature to form a black polymer having low specific resistivities of about $1 \times 10^8$ ohm-cm. The quaternary derivative obtained with dimethyl sulfate is found to be a black water-soluble polymer while that obtained with methyl iodide is found to be water-insoluble. The quaternized polymers may also be obtained by quaternization of the first described polymer with quaternization reagents. More severe conditions are required to quaternize the final polymer, heating and stirring with reflux being utilized to form the analogous products.

Compositions of even higher conductivity can be prepared by forming polymeric analogues of organic charge transfer complexes with a negative organic charge transfer complexing agent. For example, the polymeric quaternary pyridinium polymer of the invention, $(P^+)_n$, can be combined with a salt of 7,7,8,8-tetracyanoquinodimethane (TCNQ) to form products believed to have the structure $(P^+)_n(TCNQ)_n$ where $n$ represents the number of quaternary nitrogen centers in the polymer. The mechanism of electronic transporters or pseudo-metallic behavior of the polymeric salts is not well understood. The salts have also been found to exhibit even higher electrical conductivity in the presence of neutral cyano compounds such as neutral TCNQ. On addition of neutral TCNQ, the resistivity of the product is further lowered, probably caused by increased electron delocalization. These charge transfer complexes are formed by dissolving the polymer and the TCNQ in mutual solvents such as methanol. The resulting precipitate is filtered and dried to form the desired charge transfer complex.

DESCRIPTION OF THE PREFERRED EMBODIMENTS

The invention will now be illustrated by the following detailed examples of practice. It is to be understood that these examples are offered by way of illustration only and are not intended in any way to limit the invention.

Example I

Seventy-three grams of purified 6-methyl-2-pyridine-carboxaldehyde were added to 200 cc. of acetic anhydride. The mixture was heated with stirring at reflux for about 18 hours. The mixture was rendered basic with aqueous potassium hydroxide and stirred for one hour. The solid material that formed was removed by filtration and was washed in 1500 cc. of distilled water. The solid polymer was reprecipitated by potassium hydroxide, refiltered and vacuum dried for two days at 50° C. to yield 64.04 grams of solid (87.8% yield). The polymer forms a black film on evaporation from methanol solution and exhibits a specific resistivity of $10^7$ to $10^9$ ohms-cm. The polymer is believed to have the structure indicated below:

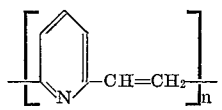

Sixty-one grams of the polymer were dissolved in 200 cc. of methanol and were passed through an alumina column to yield three fractions which were vacuum evaporated, and dried in an oven at 50° C. for 18 hours. The first fraction of about 9 grams exhibited shrinking at 265° C. with little change noted through 330° C. A second fraction of about 18.5 grams shrank at about 310° C. with again little change through 330° C. The third fraction of about 16.5 grams exhibited little change with no charring evident through 340° C.

The quaternary polymers can be prepared by quaternization of the polymer of Example I with typical quaternization reagents such as dimethyl sulfate or methyl iodide.

Example II

Ten grams of the polymer of Example I were reacted with a stoichiometric excess of dimethyl sulfate. The weight of the final product demonstrates a quantitative uptake of dimethyl sulfate to form a quaternary polymer of the formula:

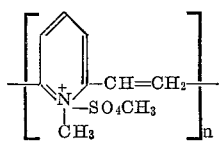

When methyl iodide was substituted for the dimethyl sulfate, a water-insoluble polymer was formed in high yield.

The quaternary polymer can also be prepared by pre-quaternization of the pyridine aldehyde monomers. With the quaternized monomers, it has been discovered that the polymerization reaction will proceed under very mild conditions of room temperature and mild alkali such as 25% alkali metal hydroxide or 1% of piperidine.

Example III 2.5 grams of 6-methyl-2-pyridine-carboxaldehyde were reacted at 25° C. with 2.6 grams of dimethyl sulfate in ether. 20 cc. of a 25% KOH aqueous solution were added to an aqueous solution of the resulting quaternary compound, and a black water-soluble polymer resulted. When methyl iodide was utilized as the quaternization reagent, the resulting polymer was water-insoluble.

The specific resistance of the black water-soluble quaternary polymer was measured and found to be about $1 \times 10^5$ ohm-cm. A quantity of the quaternary polymer was dissolved in aqueous methanol and a molar equivalent amount of lithium-TCNQ was added to the solution of polymer. The specific resistance of the composition was lowered to $1 \times 10^4$ ohm-cm. This conductivity is comparable to that of some conventional inorganic semiconductors.

Thus, a new class of conductive organic polymeric compositions have been provided by the invention. These compositions can be used in the fabrication of conductive coatings, antistatic materials and as conductive heat-resistant compounds for use in the fabrication of electronic components. Polymers can be formed from soluble starting material at very low polymerization temperatures, thus rendering the polymers readily adaptable to the preparations of films, molded structures and coatings. The polymeric compositions of the invention exhibit a high conductivity compared to other polymers and organic complexes and materials. The conductivity in some of the products approaches that of inorganic semi-conductors. Since the materials are organic rather than inorganic metal compounds, they appear to be more radiation and cosmic ray resistant than typical inorganic crystal materials. Moreover, the polymers of the invention which are soluble in methanol can readily be fabricated into thermally stable films of relatively high conductivity by casting a solution of the polymer in methanol onto a surface and evaporating the methanol. Furthermore, the polymers are synthesized from readily available low-cost starting materials and thus would appear to be considerably less expensive than any known family of conductive organic materials.

What is claimed is:

1. A method of synthesizing a solid polymer comprising the steps of:
condensing in the presence of a catalyst selected from the group consisting of zinc chloride and acetic anhydride a nuclear alkylated pyridine aldehyde of the formula:

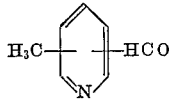

where R is lower alkyl of 1 to 5 carbon atoms until a solid polymer of the formula:

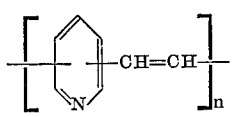

is obtained where $n$ is an integer greater than 2 and the —CH=CH— group is positioned between 2-4, 2-6, 2-3, 3-4, 3-6, or 4-6 positions on a pair of molecules.

2. A method according to claim 1 in which said pyridene aldehyde is 2-, 4-, or 6-methyl-pyridine-2-, 3-, or 4-carboxaldehyde.

3. A method according to claim 2 in which said aldehyde is selected from the group consisting of 6-methyl-2-pyridine-carboxaldehyde, 4-methyl-2-pyridine-carboxaldehyde and 2-methyl-4-pyridine-carboxaldehyde.

4. A method according to claim 1 wherein said catalyst is acetic anhydride.

5. A method of synthesizing a polymer comprising the steps of:
condensing at low temperature in the presence of a mild alkali catalyst a nuclear alkylated pyridine aldehyde of the formula:

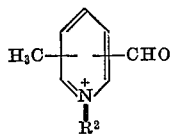

$R^2$ is a quaternizing moiety selected from the group consisting of lower alkyl, aryl, lower alkenyl and lower aralkyl until a solid polymer of the formula:

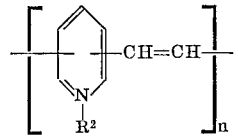

is obtained where $n$ is an integer greater than 2 and the —CH=CH— olefinic group is positioned between 2-4, 2-6, 2-3, 3-4, 3-6, or 4-6 positions on a pair of molecules.

6. A method according to claim 5 wherein said catalyst is selected from potassium hydroxide, pyridine and piperidine.

7. A polymer having a specific resistivity of no more than $10^9$ ohm-cm. of the formula:

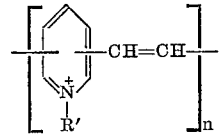

where $R'$ is selected from the group consisting of lower alkyl, aryl, lower alkenyl or aralkyl, $n$ is an integer greater than 2, and the —CH=CH— olefinic group is positioned between 2-4, 2-6, 2-3, 3-4, 3-6 or 4-6 positions on a pair of molecules.

8. A conductive composition of matter comprising the polymer of claim 7 in combination with a tetracyanoquinodimethane charge transfer complexing agent.

9. A composition according to claim 8 wherein said charge transfer complexing is lithium tetracyanoquinodimethane.

References Cited

UNITED STATES PATENTS 3,422,071    1/1969    Thomson.

OTHER REFERENCES

Lupinski et al.: Science, vol. 146, November 1964, pp. 1038–1039.

WILLIAM H. SHORT, Primary Examiner

L. M. PHYNES, Assistant Examiner

U.S. Cl. X.R.

252—500; 260—88.3, 33.4

Disclaimer 3,538,053.—*Alan Rembaum*, Altadena, and *Stanley Singer*, Pasadena, Calif. NUCLEAR ALKYLATED PYRIDINE ALDEHYDE POLYMERS AND CONDUCTIVE COMPOSITIONS THEREOF. Patent dated Nov. 3, 1970. Disclaimer filed Mar. 10, 1971, by the assignee, *California Institute of Technology*.

Hereby enters this disclaimer to claims 1 to 4 of said patent.

[*Official Gazette June 15, 1971.*]